US006555612B1

(12) United States Patent
Mayer et al.

(10) Patent No.: US 6,555,612 B1
(45) Date of Patent: Apr. 29, 2003

(54) AQUEOUS COATING MATERIAL AND MODULAR SYSTEM FOR PRODUCING SAME

(75) Inventors: Bernd Mayer, Munster (DE); Heinz-Peter Rink, Munster (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/869,243

(22) PCT Filed: Jan. 14, 2000

(86) PCT No.: PCT/EP00/00250

§ 371 (c)(1),
(2), (4) Date: Jul. 25, 2001

(87) PCT Pub. No.: WO00/44834

PCT Pub. Date: Aug. 3, 2000

(30) Foreign Application Priority Data

Jan. 28, 1999 (DE) .......................................... 199 04 330

(51) Int. Cl.$^7$ ............................. C08J 3/00; C08K 3/20; C08L 75/00
(52) U.S. Cl. ...................... 524/501; 524/507; 524/539; 524/839; 524/591; 524/840
(58) Field of Search .................................. 524/501, 507, 524/539, 839, 591, 840

(56) References Cited

U.S. PATENT DOCUMENTS

| 3,290,350 | A | 12/1966 | Hoover et al. ............... 260/453 |
| 4,130,577 | A | 12/1978 | Nagato et al. ............... 260/453 |
| 4,246,382 | A | 1/1981 | Honda et al. .................. 526/79 |
| 4,268,542 | A | 5/1981 | Sakakibara et al. ......... 427/195 |
| 4,322,325 | A | 3/1982 | Esser et al. .................. 523/457 |
| 4,369,299 | A | 1/1983 | Honda et al. ............. 526/329.7 |
| 4,439,616 | A | 3/1984 | Singh et al. .................... 560/25 |
| 4,489,135 | A | 12/1984 | Drexler et al. ............. 428/423.1 |
| 4,558,090 | A | 12/1985 | Drexler et al. ............... 524/591 |
| 4,594,374 | A | 6/1986 | Stahl et al. .................. 523/501 |
| 4,710,542 | A | 12/1987 | Forgione et al. ............ 525/424 |
| 4,719,132 | A | 1/1988 | Porter, Jr. ................... 428/409 |
| 4,730,020 | A | 3/1988 | Wilfinger et al. ............ 524/555 |
| 4,754,014 | A | 6/1988 | Ryntz et al. ................... 528/28 |
| 4,851,460 | A | 7/1989 | Stranghöner et al. ....... 524/457 |
| 4,895,910 | A | 1/1990 | Isozaki et al. ............. 525/326.5 |
| 4,914,148 | A | 4/1990 | Hille et al. .................. 524/507 |
| 4,939,213 | A | 7/1990 | Jacobs, III et al. ...... 525/329.9 |
| 5,028,639 | A | 7/1991 | Treutlein et al. ............ 523/200 |
| 5,079,312 | A | 1/1992 | Isozaki et al. ............. 525/479 |
| 5,084,541 | A | 1/1992 | Jacobs, III et al. ........... 528/45 |
| 5,210,154 | A | 5/1993 | Weidemeier et al. ....... 525/438 |
| 5,326,820 | A | 7/1994 | Hoffmann et al. .......... 525/123 |
| 5,370,910 | A | 12/1994 | Hille et al. ............... 427/407.1 |
| 5,512,322 | A | 4/1996 | Hille et al. ............... 427/407.1 |
| 5,576,386 | A | 11/1996 | Kempter et al. .............. 526/88 |
| 5,589,228 | A | 12/1996 | Wegner et al. ........... 427/407.1 |
| 5,703,156 | A | 12/1997 | Sauer ......................... 524/802 |
| 5,726,258 | A | 3/1998 | Fischer et al. ................ 526/64 |
| 6,159,556 | A | 12/2000 | Möller et al. ................ 427/475 |

FOREIGN PATENT DOCUMENTS

| CA | 1089140 | 11/1904 | .......... D06M/15/52 |
| CA | 2166290 | 11/1909 | ............ C09D/5/02 |
| CA | 2107351 | 3/1930 | ............ C09D/7/14 |
| CA | 2004988 | 8/1989 | ............. C08F/2/24 |
| CA | 2107351 | 2/1992 | ............ C09D/7/14 |
| CA | 2114035 | 1/1994 | ............ C09D/5/38 |
| CA | 2150525 | 5/1995 | ............ C09D/5/02 |
| CA | 2190286 | 6/1995 | ........ C09D/133/02 |
| CA | 2166290 | 11/1995 | ............ C09D/5/02 |
| CA | 2216111 | 4/1996 | ........ C09D/133/14 |
| DE | 26 24 442 A1 | 12/1975 | ............. C98J/3/06 |
| DE | 28 48 906 A1 | 5/1979 | .......... C08F/20/18 |
| DE | 29 26 584 A1 | 1/1981 | ............ C09D/3/64 |
| DE | 32 10 051 A1 | 9/1983 | ............ C09D/3/72 |
| DE | 33 21 180 A1 | 12/1984 | ............ C09D/3/66 |
| DE | 37 06 095 A1 | 9/1986 | ........... C08G/77/20 |
| DE | 38 07 571 A1 | 3/1987 | ........... C08L/83/07 |
| DE | 36 28 124 A1 | 3/1988 | ........... C09D/3/727 |
| DE | 36 36 183 A1 | 3/1988 | ............ C09D/5/38 |
| DE | 37 39 332 A1 | 6/1989 | ............. B05D/7/24 |
| DE | 38 13 866 A1 | 11/1989 | ............ C09D/3/72 |
| DE | 38 41 540 A1 | 6/1990 | ............. C08F/2/24 |
| DE | 40 05 961 A1 | 8/1991 | ............. B05D/7/16 |
| DE | 40 24 204 A1 | 2/1992 | ......... C09D/175/04 |
| DE | 0 614 951 A2 | 3/1993 | ............ C09D/7/14 |
| DE | 196 18 657 A1 | 5/1995 | ............ C09D/5/46 |
| DE | 44 07 841 A1 | 9/1995 | .......... C08L/33/06 |
| DE | 44 15 292 A1 | 11/1995 | ............ C09D/5/02 |
| DE | 195 10 651 A1 | 12/1995 | ......... C09D/175/04 |

(List continued on next page.)

OTHER PUBLICATIONS

English Abstract for DE 44 07 841 A1.
English Abstract for EP 0 008 127 A1.
English Abstract for DE 37 39 332 A1.
English Abstract for DE 33 21 180 A1.
English Abstract for DE 197 09 465 A1.
English Language Abstract is Privided wit the International Publication WO 94/22968.
English Language Abstract is Privided wit the International Publication WO 92/22615.

*Primary Examiner*—Patrick D. Niland

(57) ABSTRACT

An aqueous coating material preparable by mixing (A) at least one base paint comprising (a1) at least one optionally water-soluble or -dispersible binder, (a2) at least one color and/or effect pigment, and (a3) at least one water-miscible organic solvent, and further comprising if desired (a4) water, (a5) at least one crosslinking agent and/or (a6) at least one auxiliary and/or additive; (B) at least one solid, finely divided mixing varnish comprising (b1) at least one water-soluble or -dispersible, finely divided, solid binder; and (C) an aqueous medium with one another; and also a modular system for preparing aqueous coating materials, comprising (I) at least one color and/or effect module comprising at least one base paint (A), (II) at least one solid module comprising at least one solid, finely divided mixing varnish (B) and (III) at least one dispersing module comprising an aqueous medium (C).

18 Claims, No Drawings

FOREIGN PATENT DOCUMENTS

| | | | | |
|---|---|---|---|---|
| DE | 44 21 823 A1 | 1/1996 | ......... | C09D/175/04 |
| DE | 196 13 547 A1 | 11/1996 | ............ | C09D/5/46 |
| DE | 195 24 182 A1 | 1/1997 | ......... | C08F/212/08 |
| DE | 35 45 618 A1 | 6/1997 | ............ | C09D/3/72 |
| DE | 197 09 465 A1 | 9/1998 | ............ | B05D/7/26 |
| EP | 0 008 127 A1 | 8/1979 | ............ | E21F/17/00 |
| EP | 0 089 497 A2 | 3/1982 | ............ | C09D/3/72 |
| EP | 0 101 832 A1 | 7/1982 | ........ | C07C/125/073 |
| EP | 0 195 931 A1 | 2/1985 | ............ | C09D/3/80 |
| EP | 0 158 099 A2 | 3/1985 | ............ | C09D/5/38 |
| EP | 0 245 700 A2 | 5/1986 | ........ | C07D/251/54 |
| EP | 0 249 201 A2 | 6/1986 | ............ | C09D/3/58 |
| EP | 0 276 501 A2 | 1/1987 | ............ | C11D/1/42 |
| EP | 0 355 433 A2 | 7/1988 | ............ | C08G/18/08 |
| EP | 0 358 153 B1 | 9/1989 | ........ | C09D/143/04 |
| EP | 0 554 783 A1 | 2/1992 | ............ | B01J/19/18 |
| EP | 0 752 455 A1 | 2/1992 | ............ | C09D/7/14 |
| EP | WO 92/17554 | 10/1992 | ............ | C09D/7/14 |
| EP | 0 624 577 A1 | 5/1993 | ......... | C07D/251/70 |
| EP | 0 652 264 A2 | 11/1993 | ............ | C09D/5/03 |
| EP | 0 608 733 A1 | 1/1994 | ............ | C09D/5/02 |
| EP | 0 698 773 A1 | 8/1995 | ............ | F28D/1/03 |
| EP | WO 97/12945 | 4/1997 | ............ | C09D/5/04 |
| FR | 2 547 592 A1 | 6/1983 | ............ | C09D/3/58 |
| WO | WO 82/02387 | 7/1982 | ............ | C08F/2/02 |
| WO | WO 92/22615 | 12/1992 | ............ | C09D/151/08 |
| WO | WO 93/17060 | 9/1993 | ............ | C08G/63/02 |
| WO | WO 94/22968 | 10/1994 | ......... | C09D/133/06 |
| WO | WO 95/27742 | 10/1995 | ............ | C08F/18/04 |
| WO | WO 96/12754 | 5/1996 | ............ | C08G/63/20 |

AQUEOUS COATING MATERIAL AND MODULAR SYSTEM FOR PRODUCING SAME

The present invention relates to novel aqueous coating materials which comprise at least one base paint (A), at least one mixing varnish (B), and an aqueous medium (C). The present invention further relates to a novel modular system which is used to prepare the novel aqueous coating materials. The present invention relates not least to a novel process for preparing coating materials.

Aqueous coating materials of the type specified at the outset, in which the mixing varnish (B) and the aqueous medium (C) are present as a mixture with one another, and also the corresponding modular systems based on anionically or nonionically stabilized dispersions comprising a color and/or effect module and a mixing varnish module, are known from the patents EP-A-0 578 645 and EP-A-0 698 773. Their mixing varnish (B) or mixing varnish module, respectively, comprises binders in dispersion or solution in water. Modular systems based on cationically stabilized dispersions are known from the patent DE-A-44 15 292.

The known aqueous coating materials may be prepared with the aid of the known modular systems in a simple manner in a large number of shades, in conjunction where appropriate with a very wide variety of optical effects such as metallic effects, pearlescent effects or angle-dependent effects. The modular systems have therefore been able to establish themselves, especially in automotive refinish, and have numerous other advantages. For instance, they have a comparatively low solvent content and are easy to apply and to dispose of. In terms of optical properties, hardness, flexibility, scratch resistance, solvent resistance and weathering stability, the coatings produced from them have a profile of properties which entirely meets the exacting requirements of the market.

These known coating materials and the mixing varnish module of the known modular systems comprise water-dissolved or -dispersed binders which in the dissolved or dispersed state, especially on prolonged storage, become infested by microorganisms and destroyed, thereby rendering the coating materials and the mixing varnish module unusable and needing disposal, which is a serious disadvantage from both a technical and an economic standpoint.

Where the infested coating materials and mixing varnish modules are nevertheless used, they give coatings which no longer meet user requirements, especially in the automobile industry.

Attempts have therefore been made to master these problems by adding bactericidal and/or fungicidal substances, but this just introduces new problems. On the one hand, user and environment suffer increased exposure to these toxic substances, which viewed per se is already a disadvantage. Furthermore, the widespread and intensive use of the substances may be accompanied by resistance of the microorganisms, whose adverse effects are not only restricted to the technological field in question here but extend to other fields as well.

The German patent DE-A-44 07 841 discloses pulverulent redispersible binders which are processed with conventional solid coatings constituents to give pulverulent coating materials. Starting from the dry mixes, the ready-to-use coating materials may be prepared by mixing with water. Use in modular systems as solid, finely divided mixing varnishes is not described, however.

It is an object of the present invention to find a novel coating material which does not have the disadvantages depicted above but which instead is infested to a considerably reduced degree, if at all, by microorganisms and therefore has greater storage stability than the known coating materials while at least retaining if not indeed improving further on their advantageous properties.

The invention accordingly provides the novel coating material preparable by mixing (A) at least one base paint comprising
 (a1) at least one optionally water-soluble or -dispersible binder,
 (a2) at least one color and/or effect pigment, and
 (a3) at least one water-miscible organic solvent, and further comprising if desired
 (a4) water,
 (a5) at least one crosslinking agent and/or
 (a6) at least one auxiliary and/or additive;
(B) at least one solid, finely divided mixing varnish comprising
 (b1) at least one water-soluble or -dispersible, finely divided, solid binder; and
(C) an aqueous medium with one another.

In the text below, the novel coating material is referred to as "coating material of the invention".

The invention also provides the novel modular system for preparing aqueous coating materials, comprising (I) at least one color and/or effect module comprising
 (A) at least one base paint comprising
  (a1) at least one optionally water-soluble or -dispersible binder,
  (a2) at least one color and/or effect pigment, and
  (a3) at least one water-miscible organic solvent, and further comprising if desired
  (a4) water,
  (a5) at least one crosslinking agent and/or
  (a6) at least one auxiliary and/or additive;
(II) at least one solids module comprising
 (B) at least one solid, finely divided mixing varnish comprising
  (b1) at least one water-soluble or -dispersible, finely divided, solid binder; and
(III) at least one dispersing module comprising
 (C) an aqueous medium.

In the text below, the novel modular system for preparing the coating materials of the invention is referred to for the sake of brevity as "modular system of the invention".

The invention not least provides a novel process for preparing an aqueous coating material, in which (A) at least one base paint comprising
 (a1) at least one optionally water-soluble or -dispersible binder,
 (a2) at least one color and/or effect pigment, and
 (a3) at least one water-miscible organic solvent, and further comprising if desired
 (a4) water,
 (a5) at least one crosslinking agent and/or
 (a6) at least one auxiliary and/or additive; and
(B) at least one mixing varnish dispersed in
(C) an aqueous medium, wherein the mixing varnish (B) is finely divided and solid and comprises or consists of at least one finely divided solid binder (b1).

In the text below, the novel process for preparing a coating material is referred to for the sake of brevity as "process of the invention".

The present invention additionally provides for the use of the coating materials, modular systems, and process of the invention in automotive OEM finishing, refinish, and the coating of plastics, especially with topcoats or primer-surfacer coats.

The particular advantage of the coating material of the invention and of the modular system is that the mixing varnish (B) or the solids module (II) is substantially free from dissolved or dispersed binders (b1) and so even on prolonged storage is no longer infested by microorganisms or is infested by microorganisms only to an extent which does not perceptibly detract from its performance properties. The particular advantage of the coating material of the invention and of the modular system is also that the mixing varnish (B) or the solids module (II) may be stored for a particularly long time without detriment to its performance properties. Moreover, in the form of finely divided solids, it may be metered with particular simplicity, rapidity, and accuracy to the base paint (A) and to the aqueous medium (C) or, respectively, to the color and/or effect module (I) and to the dispersing module (III) as part of the process of the invention.

It is surprising, moreover, that the coating material of the invention may be prepared by simple mixing without the need for complex apparatus for mixing or dispersing as described, for example, in the German patent DE-A-195 10 651. The coating material of the invention is therefore particularly suitable for the automotive refinish sector as well, since it may be prepared by the painter directly prior to its application, by simple mixing of the modules (I), (II) and (III).

A further advantage is that the coating material for the invention includes a comparatively small amount of volatile organic solvents despite being prepared using organically dissolved dispersed binders (a1).

Furthermore, the coating compositions of the invention ensure a high level of variability, since it is possible to use not only crosslinking agents, pigments, and auxiliaries and additives that are recommended for aqueous coating compositions but also those which are used in conventional systems.

The key constituent of the coating material of the invention is a finely divided solid mixing varnish (B). In accordance with the invention, said varnish comprises at least one water-soluble or -dispersible, finely divided solid binder (b1).

The key constituent of the modular system of the invention in turn is a solids module (II). In accordance with the invention said module comprises at least one finely divided solid mixing varnish (B) whose key constituent is at least one water-soluble or -dispersible, finely divided solid binder (b1).

In the context of the present invention, the term "module" denotes a standardized ready-to-use commercial product whose profile of performance properties is precisely adapted to and supplements the profiles of properties of other modules, so that the modules overall may be combined into a modular system.

The water-soluble or -dispersible, finely divided solid binders (b1) to be used for this purpose in accordance with the invention are oligomeric or polymeric resins. The binders (b1) are physically drying or else contain functional groups which are able to react with the crosslinking agents (a5) or (b3) described below.

Examples of suitable functional groups are amino, thio, carbonate, epoxide and/or hydroxyl groups, of which the hydroxyl groups are particularly advantageous and are therefore particularly preferred in accordance with the invention.

Accordingly, the finely divided solid binders (b1) which are preferred in accordance with the invention comprise hydroxyl-containing oligomeric or polymeric resins.

Examples of suitable finely divided solid binders (b1) preferred in accordance with the invention are hydroxyl-containing linear and/or branched and/or block, comb and/or random poly(meth)acrylates or acrylate copolymers, polyesters, alkyds, amino resins, polyurethanes, acrylated polyurethanes, acrylated polyesters, polylactones, polycarbonates, polyethers, epoxy resin-amine adducts, (meth)acrylatediols, partially saponified polyvinyl esters or polyureas, of which the acrylate copolymers, the polyesters, the polyurethanes, the polyethers, and the epoxy resin-amine adducts are particularly advantageous and are therefore used with particular preference.

Regarding the preparability, the handling and the particularly advantageous properties of the coating compositions of the invention that are prepared using them, the acrylate copolymers, the polyesters and/or the polyurethanes, especially the polyurethanes, afford very particular advantages, and so are used with very particular preference in accordance with the invention.

In accordance with the invention the finely divided solid binders (b1) are individually dispersible or soluble in water.

Examples of suitable water-soluble or water-dispersible finely divided solid binders (b1) contain alternatively (i) functional groups which can be converted into cations by neutralizing agents and/or quaternizing agents, and/or cationic groups, or (ii) functional groups which can be converted into anions by neutralizing agents, and/or anionic groups, and/or (iii) nonionic hydrophilic groups.

Examples of suitable functional groups (i) for use in accordance with the invention that can be converted into cations by neutralizing agents and/or quaternizing agents are primary, secondary or tertiary amino groups, secondary sulfide groups or tertiary phosphine groups, especially tertiary amino groups or secondary sulfide groups.

Examples of suitable cationic groups (i) for use in accordance with the invention are primary, secondary, tertiary or quaternary ammonium groups, tertiary sulfonium groups or quaternary phosphonium groups, preferably quaternary ammonium groups or tertiary sulfonium groups, but especially tertiary sulfonium groups.

Examples of suitable functional groups (ii) for use in accordance with the invention that may be converted into anions by neutralizing agents are carboxylic acid, sulfonic acid or phosphonic acid groups, especially carboxylic acid groups.

Examples of suitable anionic groups (ii) for use in accordance with the invention are carboxylate, sulfonate or phosphonate groups, especially carboxylate groups.

Examples of suitable nonionic hydrophilic groups (iii) for use in accordance with the invention are polyether groups, especially poly(alkylene ether) groups.

The selection of the groups (i) or (ii) is to be made such that no disruptive reactions are possible with the functional groups which are able to react with crosslinking agents (b3). The skilled worker will therefore make the selection in a simple manner on the basis of his or her knowledge in the art.

Examples of suitable neutralizing agents for functional groups (i) which can be converted into cations are organic and inorganic acids such as formic acid, acetic acid, lactic acid, dimethylolpropionic acid, citric acid, sulfuric acid, hydrochloric acid or phosphoric acid.

Examples of suitable neutralizing agents for functional groups (ii) which can be converted into anions are ammonia, ammonium salts, such as ammonium carbonate or ammonium hydrogen carbonate, and also amines, such as trimethylamine, triethylamine, tributylamine, dimethylaniline, diethylaniline, triphenylamine, dimethylethanolamine, diethylethanolamine, methyldiethanolamine, triethanolamine and the like. Neutralization may take place in the organic phase or in the aqueous phase. Dimethylethanolamine is preferably used as neutralizing agent.

In general the amount of neutralizing agent is chosen so that from 1 to 100 equivalents, preferably from 50 to 90 equivalents, of the functional groups (i) or (ii) of the binder (b1) are neutralized.

Regarding the preparability, handling and particularly advantageous properties of the coating materials and modular systems of the invention prepared using them, the finely divided solid binders (b1) which contain the anion-forming groups and/or anions (ii), especially the carboxylic acid groups and/or the carboxylate groups, afford very particular advantages, and so are used with very particular preference in accordance with the invention.

Examples of very particularly preferred finely divided solid binders (b1) of the last-mentioned type, for use in accordance with the invention, are (b11) acrylate copolymers (b1) which are described below and contain hydroxyl groups and carboxylic acid and/or carboxylate groups, (b12) the polyester resins (b1) which are described below and contain hydroxyl groups and carboxylic acid and/or carboxylate groups, and/or (b13) the polyurethane resins (b1) which are described below and contain hydroxyl groups and carboxylic acid and/or carboxylate groups.

In particular, use is made of finely divided solid acrylate copolymers (b11) obtainable by bulk polymerization, polymerization in an organic solvent or a solvent mixture, by emulsion polymerization or precipitation polymerization in water, and in the presence of at least one polymerization initiator, of m1) a (meth)acrylic ester which is substantially free from acid groups and is different from but copolymerizable with (m2), (m3), (m4), (m5), and (m6), or a mixture of such monomers (m1), m2) an ethylenically unsaturated monomer which carries at least one hydroxyl group per molecule and is substantially free from acid groups, and which is copolymerizable with (m1), (m3), (m4), (m5), and (m6) but different from (m5), or a mixture of such monomers (m2), m3) an ethylenically unsaturated monomer which carries per molecule at least one acid group which can be converted into the corresponding acid anion group, and which is copolymerizable with (m1), (m2), (m4), (m5), and (m6), or a mixture of such monomers (m3), and m4) if desired, one or more vinyl esters of alpha-branched monocarboxylic acids having from 5 to 18 carbon atoms per molecule, and/or m5) if desired, at least one reaction product of acrylic acid and/or methacrylic acid with the glycidyl ester of an alpha-branched monocarboxylic acid having from 5 to 18 carbon atoms per molecule, or instead of the reaction product an equivalent amount of acrylic and/or methacrylic acid which is then reacted during or after the polymerization reaction with the glycidyl ester of an alpha-branched monocarboxylic acid having from 5 to 18 carbon atoms per molecule, m6) if desired, an ethylenically unsaturated monomer which is substantially free from acid groups, is copolymerizable with (m1), (m2), (m3), (m4), and (m5) but different from (m1), (m2), (m4), and (m5); or a mixture of such monomers (m6), the nature and amount of (m1), (m2), (m3), (m4), (m5), and (m6) being selected so that the polyacrylate resin (b11) has the desired OH number, acid number, and molecular weight.

To prepare the finely divided solid acrylate copolymers (b11) it is possible as component (m1) to use any (meth) acrylic alkyl or cycloalkyl ester which is copolymerizable with (m2), (m3), (m4), (m5), and (m6) and which has up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indene-methanol or tert-butylcyclohexyl(meth)acrylate; (meth)acrylic oxaalkyl esters or oxacycloalkyl esters such as ethyl triglycol(meth)acrylate and methoxyoligoglycol(meth) acrylate having a molecular weight Mn of preferably 550; or other ethoxylated and/or propoxylated, hydroxyl-free (meth) acrylic acid derivatives. These may contain minor amounts of (meth)acrylic alkyl or cycloalkyl esters of higher functionality, such as ethylene glycol, propylene glycol, diethylene glycol, dipropylene glycol, butylene glycol, 1,5-pentanediol, 1,6-hexanediol, octahydro-4,7-methano-1H-indenedimethanol or 1,2-, 1,3- or 1,4-cyclohexanediol di(meth)acrylate; trimethylolpropane di- or tri(meth) acrylate; or pentaerythritol di-, tri- or tetra(meth)acrylate. In the context of the present invention, minor amounts of monomers of relatively high functionality are understood as being amounts which do not lead to crosslinking or gelling of the polyacrylate resins.

As component (m2) it is possible to use ethylenically unsaturated monomers which carry at least one hydroxyl group per molecule and are substantially free from acid groups, and are copolymerizable with (m1), (m2), (m3), (m4), (m5), and (m6) but different from (m5), such as hydroxyalkyl esters of acrylic acid, methacrylic acid or another alpha,beta-ethylenically unsaturated carboxylic acid which are derived from an alkylene glycol which is esterified with the acid or are obtainable by reacting the acid with an alkylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; 1,4-bis(hydroxymethyl)cyclohexane, octahydro-4,7-methano-1H-indenedimethanol, or methylpropanediol monoacrylate, monomethacrylate, monoethacrylate, monocrotonate, monomaleate, monofumarate or monoitaconate; or reaction products of cyclic esters, such as epsiloncaprolactone, for example and these hydroxyalkyl esters; or olefinically unsaturated alcohols such as allyl alcohol or polyols such as trimethylolpropane monoallyl or diallyl ether or pentaerythritol monoallyl, diallyl or triallyl ether. Regarding these monomers (m2) of higher functionality, the comments made regarding the higher-functional monomers (m1) apply analogously. The fraction of trimethylolpropane monoallyl ether is usually from 2 to 10% by weight, based on the overall weight of the monomers (m1) to (m6) used to prepare the polyacrylate resin. In addition, however, it is also possible to add from 2 to 10% by weight, based on the overall weight of the monomers used to prepare the polyacrylate resin, of trimethylolpropane monoallyl ether to the finished polyacrylate resin. The olefinically unsaturated polyols, such as trimethylolpropane monoallyl ether in particular, may be used as sole hydroxyl-containing monomers, but in particular may also be used proportionally in combination with other of the hydroxyl-containing monomers mentioned.

As component (m3), it is possible to use any ethylenically unsaturated monomer which carries at least one acid group, preferably a carboxyl group, per molecule and is copolymerizable with (m1), (m2), (m4), (m5), and (m6); or a mixture of such monomers. Acrylic acid and/or methacrylic acid are used with particular preference as component (m3). It is, however, also possible to use other ethylenically unsaturated carboxylic acids having up to 6 carbon atoms in the molecule. Examples of such acids are ethacrylic acid, crotonic acid, maleic acid, fumaric acid, and itaconic acid. A further possibility is to use ethylenically unsaturated sulfonic or phosphonic acids, and/or their partial esters, as component (m3). Further suitable components (m3) include mono(meth)acryloyloxyethyl maleate, succinate, and phthalate.

As component (m4) use is made of one or more vinyl esters of alpha-branched monocarboxylic acids having from 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may contain both branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are, for example, propylene trimer, propylene tetramer, and diisobutylene. Alternatively, the vinyl esters may be prepared conventionally from the acids, by reacting the acid with acetylene, for example. Particular preference is given—owing to their ready availability—to using vinyl esters of saturated aliphatic monocarboxylic acids having 9 to 11 carbon atoms that are branched on the alpha carbon atom.

As component (m5), the reaction product of acrylic acid and/or methacrylic acid with the glycidyl ester of an alpha-branched monocarboxylic acid having from 5 to 18 carbon atoms per molecule is used. Glycidyl esters of highly branched monocarboxylic acids are available under the tradename Cardura. The reaction of the acrylic or methacrylic acid with the glycidyl ester of a carboxylic acid having a tertiary alpha carbon atom may take place before, during or after the polymerization reaction. As component (m5) it is preferred to use the reaction product of acrylic and/or methacrylic acid with the glycidyl ester of Versatic acid. This glycidyl ester is available commercially under the name Cardura E10.

As component (m6) it is possible to use all ethylenically unsaturated monomers that are substantially free from acid groups and are copolymerizable with (m1), (m2), (m3), (m4), and (m5) but different from (m1), (m2), (m3), and (m4); or mixtures of such monomers. Suitable components (m6) include olefins such as ethylene, propylene, 1-butene, 1-pentene, 1-hexene, cyclohexene, cyclopentene, norbornene, butadiene, isoprene, cyclopentadiene and/or dicyclopentadiene;

(meth)acrylamides such as (meth)acrylamide, N-methyl-, N,N-dimethyl-, N-ethyl-, N,N-diethyl-, N-propyl-, N,N-dipropyl, N-butyl-, N,N-dibutyl-, N-cyclohexyl- and/or N,N-cyclohexyl methyl(meth)acrylamide;

monomers containing epoxide groups, such as the glycidyl ester of acrylic acid, methacrylic acid, ethacrylic acid, crotonic acid, maleic acid, fumaric acid and/or itaconic acid;

vinylaromatic hydrocarbons, such as styrene, alpha-alkylstyrenes, especially alpha-methyl-styrene, and/or vinyltoluene;

nitriles such as acrylonitrile and/or methacrylonitrile;

vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate and/or the vinyl ester of 2-methyl-2-ethylheptanoic acid; and/or polysiloxane macromonomers which have a number average molecular weight Mn of from 1,000 to 40,000, preferably from 2,000 to 20,000, with particular preference from 2,500 to 10,000, and in particular from 3,000 to 7,000, and contain on average from 0.5 to 2.5, preferably from 0.5 to 1.5, ethylenically unsaturated double bonds per molecule, as described in DE-A 38 07 571 on pages 5 to 7, in DE-A 37 06 095 in columns 3 to 7, in EP-B-0 358 153 on pages 3 to 6, in U.S. Pat. No. 4,754,014 in columns 5 to 9, in DE-A 44 21 823, or in the international patent application WO 92/22615 on page 12, line 18 to page 18, line 10, or acryloxysilane-containing vinyl monomers, preparable by reacting hydroxy-functional silanes with epichlorohydrin and then reacting that reaction product with methacrylic acid and/or hydroxyalkyl esters of (meth) acrylic acid.

It is preferred to use vinylaromatic hydrocarbons (m6).

The nature and amount of components (m1) to (m6) is selected such that the finely divided solid acrylate copolymer (b11) has the desired OH number, acid number, and glass transition temperature.

Viewed in terms of its method, the preparation of the acrylate copolymers (b11) for use in accordance with the invention has no special features but instead takes place in accordance with the customary and known techniques of copolymerization in bulk, solution or emulsion or by suspension or precipitation polymerization.

To prepare the acrylate copolymers (b11) used with preference in accordance with the invention it is advantageous to use polymerization initiators.

Examples of suitable polymerization initiators are initiators which form free radicals, such as tert-butyl peroxyethylhexanoate, benzoyl peroxide, di-tert-amyl peroxide, azobisisobutyronitrile, and tert-butyl perbenzoate, for example. The initiators are used preferably in an amount from 1 to 25% by weight, with particular preference from 2 to 10% by weight, based on the overall weight of the monomers.

The polymerization is appropriately conducted at a temperature from 80 to 200° C., preferably from 110 to 180° C. Preferred solvents used are ethoxyethyl propionate and isopropoxypropanol.

The acrylate copolymer (b11) is preferably prepared by a two-stage process, since in that way the resultant coating materials of the invention possess better processing properties. It is therefore preferred to use acrylate copolymers (b11) which are obtainable by 1. polymerizing a mixture of (m1), (m2), (m4), (m5), and (m6), or a mixture of portions of components (m1), (m2), (m4), (m5), and (m6), in an organic solvent, 2. after at least 60% by weight of the mixture consisting of (m1), (m2), (m4), (m5), and, where appropriate, (m6) have been added, adding (m3) and any remainder of components (m1), (m2), (m4), (m5), and (m6), and continuing polymerization, and
3. after the end of the polymerization, subjecting the resulting polyacrylate resin if desired to at least partial neutralization, i.e., converting the acid groups into the corresponding acid anion groups.

In addition, however, it is also possible to include components (m4) and/or (m5) in the initial charge together with at least part of the solvent, and to meter in the remaining components. Moreover, it is also possible for components (m4) and/or (m5) to be included only in part in the initial charge, together with at least part of the solvent, and for the remainder of these components to be added as described above. Preferably, for example, at least 20% by weight of the solvent and about 10% by weight of component (m4) and (m5), and also, if desired, portions of components (m1) and (m6), are included in the initial charge.

Preference is also given to preparing the acrylate copolymers (b11) by means of a two-stage process whose first stage lasts from 1 to 8 hours, preferably from 1.5 to 4 hours, and in which the mixture of (m3) and any remainder of components (m1), (m2), (m4), (m5), and (m6) is added over the course of from 20 to 120 minutes, preferably over the course of from 30 to 90 minutes. Following the end of the addition of the mixture of (m3) and any remainder of components (m1), (m2), (m4), (m5), and (m6), polymerization is continued until all of the monomers used have undergone substantially complete reaction. The second stage in this process may immediately follow the first. Alternatively, the second stage may be commenced after a certain time, for example after from 10 minutes to 10 hours.

The amount and rate of addition of the initiator are chosen so as to give a polyacrylate resin (b11) having the desired number average molecular weight Mn. It is preferred to commence the initiator feed a certain time, generally about 15 minutes, before the feeding of the monomers. Preference is given, further, to a process in which the addition of initiator is commenced at the same point in time as the addition of the monomers and is ended about half an hour after the addition of the monomers has ended. The initiator is preferably added in a constant amount per unit time. Following the end of the addition initiator, the reaction mixture is held at polymerization temperature until (generally 1.5 hours) all of the monomers used have undergone substantially complete reaction. "Substantially complete reaction" is intended to denote that preferably 100% by weight of the monomers used have undergone reaction but that it is also possible for a small residual monomer content of not more than up to about 0.5% by weight, based on the weight of the reaction mixture, to remain unreacted.

Preferably, the monomers for preparing the acrylate copolymers (b11) are polymerized at a polymerization solids which is not too high, preferably at a polymerization solids of from 80 to 50% by weight, based on the comonomers, and then the solvents are removed in part by distillation, so that the resulting acrylate copolymer solutions (b11) have a solids content of preferably from 100 to 60% by weight.

The preparation of the finely divided solid acrylate copolymers (b11) for use in accordance with the invention takes place using the methods of continuous or batchwise copolymerization that are known and customary in the polymers field, under atmospheric pressure or superatmospheric pressure, in stirred tanks, autoclaves, tube reactors or Taylor reactors.

Examples of suitable (co)polymerization processes for preparing the acrylate copolymers (b11) are described in the patents DE-A-197 09 465, DE-C-197 09 476, DE-A-28 48 906, DE-A-195 24 182, EP-A-0 554 783, WO 95/27742, DE-A-38 41 540 or WO 82/02387.

Taylor reactors are advantageous, especially for copolymerization in bulk, solution or emulsion.

Taylor reactors, which serve to convert substances under the conditions of Taylor flow, are known. They consist substantially of two coaxial concentric cylinders of which the outer is fixed and the inner rotates. The reaction space is the volume formed by the gap between the cylinders. Increasing angular velocity $\omega_i$ of the inner cylinder is accompanied by a series of different flow patterns which are characterized by a dimensionless parameter, known as the Taylor number Ta. In addition to the angular velocity of the stirrer, the Taylor number is also dependent on the kinematic viscosity $\nu$ of the fluid in the gap and on the geometric parameters, the external radius of the inner cylinder $r_i$, the internal radius of the outer cylinder $r_o$, and the gap width d, the difference between the two radii, in accordance with the following formula:

$$Ta = \omega_i r_i d \, \nu^{-1} (d/r_i)^{1/2} \quad (I)$$

where $d = r_o - r_i$.

At low angular velocity, the laminar Couette flow, a simple shear flow, develops. If the rotary speed of the inner cylinder is increased further, then, above a critical level, alternately contrarotating vortices (rotating in opposition) occur, with axes along the peripheral direction. These vortices, called Taylor vortices, are rotationally symmetrical and have a diameter which is approximately the same size as the gap width. Two adjacent vortices form a vortex pair or vortex cell.

The basis for this behavior is the fact that, in the course of rotation of the inner cylinder with the outer cylinder at rest, the fluid particles that are near to the inner cylinder are subject to a greater centrifugal force than those at a greater distance from the inner cylinder. This difference in the acting centrifugal forces displaces the fluid particles from the inner to the outer cylinder. The centrifugal force acts counter to the viscosity force, since for the motion of the fluid particles it is necessary to overcome the friction. Any increase in the rotary speed is accompanied by an increase in the centrifugal force as well. The Taylor vortices are formed when the centrifugal force exceeds the stabilizing viscosity force.

In the case of Taylor flow with a low axial flow, each vortex pair passes through the gap, with only a low level of mass transfer between adjacent vortex pairs. Mixing within such vortex pairs is very high, whereas axial mixing beyond the pair boundaries is very low. A vortex pair may therefore be regarded as a stirred tank in which there is thorough mixing. Accordingly, the flow system behaves as an ideal flow tube in that the vortex pairs pass through the gap with constant residence time, like ideal stirred tanks.

Of advantage in accordance with the invention here are Taylor reactors having an external reactor wall located within which there is a concentrically or eccentrically disposed rotor, a reactor floor, and a reactor lid, which together define the annular reactor volume, at least one means for metered addition of reactants, and a means for the discharge of product, where the reactor wall and/or the rotor are or is geometrically designed in such a way that the conditions for Taylor flow are met over substantially the entire reactor length in the reactor volume, i.e., in such a way that the annular gap broadens in the direction of flow traversal.

In the mixing varnishes (B), use is made in particular of polyester resins (b12) obtainable by reacting p1) optionally sulfonated polycarboxylic acids or their esterifiable derivatives, together if desired with monocarboxylic acids, 2) polyols, together if desired with monools, 3) if desired, further modifying components, and 4) if desired, a component which is reactive with the reaction product of (p1), (p2) and, where appropriate, (p3).

Examples that may be given of polycarboxylic acids that may be used as component (p1) are aromatic, aliphatic, and cycloaliphatic polycarboxylic acids. As component (p1) it is preferred to use aromatic and/or aliphatic polycarboxylic acids.

Examples of suitable polycarboxylic acids are phthalic acid, isophthalic acid, terephthalic acid, phthalic, isophthalic or terephtalic monosulfonate, halophthalic acids, such as tetrachlorophthalic or tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid, or cyclobutanetetracarboxylic acid. The cycloaliphatic polycarboxylic acids may be used either in their cis or in their trans form or as a mixture of both forms. Also suitable are the esterifiable derivatives of the aforementioned polycarboxylic acids, such as their monoesters or polyesters with aliphatic alcohols having from 1 to 4 carbon atoms or hydroxy alcohols having from 1 to 4 carbon atoms, for example. It is also possible to use the anhydrides of the abovementioned acids, where they exist.

If desired, together with the polycarboxylic acids it is also possible to use monocarboxylic acids, such as benzoic acid, tert-butylbenzoic acid, lauric acid, isononanoic acid, and fatty acids of naturally occurring oils, for example. Isononanoic acid is a preferred monocarboxylic acid used.

Suitable alcohol components (p2) for preparing the polyester (b12) are polyhydric alcohols, such as ethylene glycol, propanediols, butanediols, hexanediols, neopentyl hydroxypivalate, neopentyl glycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, trishydroxyethyl isocyanate, polyethylene glycol, polypropylene glycol, alone or together with monohydric alcohols, such as butanol, octanol, lauryl alcohol, cyclohexanol, tert-butylcyclohexanol, ethoxylated and/or propoxylated phenols, for example.

Compounds suitable as component (p3) for preparing the polyesters (b12) include in particular those having a group which is reactive toward the functional groups of the polyester, with the exception of the compounds specified as component (p4). As modifying component (p3) it is preferred to use polyisocyanates and/or diepoxide compounds, and also, if desired, monoisocyanates and/or monoepoxide compounds. Suitable components (p3) are described, for example, in DE-A-40 24 204 on page 4, lines 4 to 9.

Compounds suitable as component (p4) for preparing the polyester resins (b12) are those compounds which in addition to a group that is reactive toward the functional groups of the polyester (b12) also contain a tertiary amino group, examples including monoisocyanates containing at least one tertiary amino group, or mercapto compounds containing at least one tertiary amino group. For details, refer to DE-A-40 24 204, page 4, lines 10 to 49.

The polyester resins (b12) are prepared in accordance with the known methods of esterification, as is described, for example, in DE-A-40 24 204, page 4, lines 50 to 65. This reaction takes place usually at temperatures between 180 and 280° C., in the absence or presence of an appropriate esterification catalyst, such as lithium octoate, dibutyltin oxide, dibutyltin dilaurate or para-toluenesulfonic acid, for example.

The polyester resins (b12) are normally prepared in the presence of small amounts of an appropriate solvent as entrainer. Examples of entrainers used include aromatic hydrocarbons, such as xylene in particular, and (cyclo) aliphatic hydrocarbons, e.g., cyclohexane or methylcyclohexane.

It is particularly preferred to use polyester resins (b12) which have been prepared by a two-stage process, by first preparing a hydroxyl-containing polyester having an OH number of from 100 to 300 mg KOH/g, an acid number of less than 10 mg KOH/g, and a number average molecular weight Mn of from 500 to 2,000 daltons, which is then reacted in a second stage with carboxylic anhydrides to give the desired polyester resin (b12). The amount of carboxylic anhydrides in this case is chosen so that the resulting polyester resin (b12) has the desired acid number. Acid anhydrides suitable for this reaction are all those commonly used, such as hexahydrophthalic anhydride, trimellitic anhydride, pyromellitic anhydride, phthalic anhydride, camphoric anhydride, tetrahydrophthalic anhydride, succinic anhydride, and mixtures of these and/or other anhydrides, and especially anhydrides of aromatic polycarboxylic acids, such as trimellitic anhydride, for example.

It is possible if desired for the acrylate copolymer (b12) to have been prepared at least in part in the presence of the polyester resin (b12). In this case, advantageously at least 20% by weight and with particular advantage from 40 to 80% by weight of the acrylate copolymer (b11) are prepared in the presence of the polyester resin (b12). Any remainder of the acrylate copolymer (b11) is added subsequently to the mixing varnish (B). In this case it is possible for this already polymerized resin to have the same monomer composition as the acrylate copolymer (b11) synthesized in the presence of the polyester resin (b12). Alternatively, a hydroxyl-containing acrylate copolymer (b11) having a different monomer composition may be added. Also possible is the addition of a mixture of different acrylate copolymer (b11) and/or polyester resins (b12), with possibly one resin having the same monomer composition as the acrylate copolymer (b11) synthesized in the presence of the polyester resin (b12).

Suitable polyurethane resins (b13) for use in accordance with the invention, containing hydroxyl and acid groups, are described, for example, in the following documents: EP-A-0 355 433, DE-A-35 45 618, DE-A-38 13 866, DE-A-32 10 051, DE-A-26 24 442, DE-A-37 39 332, U.S. Pat. No. 4,719,132, EP-A-0 089 497, U.S. Pat. No. 4,558,090, U.S. Pat. No. 4,489,135, DE-A-36 28 124, EP-A-0 158 099, DE-A-29 26 584, EP-A-0 195 931, DE-A-33 21 180 and DE-A-40 05 961.

In the mixing varnish (B) use is made in particular of polyurethane resins (b13) which are preparable by reacting isocyanato-containing prepolymers with compounds that are reactive toward isocyanate groups.

The preparation of isocyanato-containing prepolymers may take place by reacting polyols having a hydroxyl number of from 10 to 1,800, preferably from 50 to 1,200 mg KOH/g, with excess polyisocyanates at temperatures of up to 150° C., preferably from 50 to 130° C., in organic solvents which are unable to react with isocyanates. The equivalents ratio of NCO to OH groups is situated between 2.0:1.0 and ≧1.0:1.0, preferably between 1.4:1 and 1.1:1.

The polyols used to prepare the prepolymer may be of low molecular weight and/or high molecular weight and may contain groups that are slow to react and are anionic or capable of forming anions. It is also possible to use low molecular weight polyols having a molecular weight of from 60 up to 400 daltons to prepare the isocyanato-containing prepolymers. In this case amounts of up to 30% by weight of the overall polyol constituents are used, preferably from about 2 to 20% by weight.

In order to obtain an NCO prepolymer of high flexibility, a high fraction of a predominantly linear polyol having a preferred OH number of from 30 to 150 mg KOH/g should be added. Up to 97% by weight of the overall polyol may consist of saturated and unsaturated polyesters and/or polyethers having a number average molecular weight Mn of from 400 to 5,000 daltons. The selected polyetherdiols should not introduce excessive amounts of ether groups, since otherwise the polymers formed start to swell in water. Polyesterdiols are prepared by esterifying organic dicarboxylic acids or their anhydrides with organic diols, or derive from a hydroxycarboxylic acid or from a lactone. In order to prepare branched polyester polyols, it is possible to employ a minor proportion of polyols or polycarboxylic acids having a higher functionality.

The alcohol component used to prepare the polyurethane resins preferably consists at least to a certain extent of $u_1$) at least one diol of the formula (I')

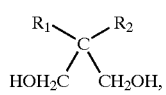

(I')

in which $R_1$ and $R_2$ are each an identical or different radical and are an alkyl radical having from 1 to 18 carbon atoms, an aryl radical or a cycloaliphatic radical, with the proviso that $R_1$ and/or $R_2$ must not be methyl, and/or $u_2$) at least one diol of the formula (II')

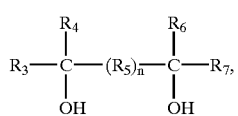

(II')

in which $R_3$, $R_4$, $R_6$ and $R_7$ are each identical or different radicals and are an alkyl radical having from 1 to 6 carbon atoms, a cycloalkyl radical or an aryl radical and Rs is an alkyl radical having from 1 to 6 carbon atoms, an aryl radical or an unsaturated alkyl radical having from 1 to 6 carbon atoms, and n is either 0 or 1.

Suitable diols ($u_1$) are all propanediols of the formula (I') in which either $R_1$ or $R_2$ or $R_1$ and $R_2$ is or are other than methyl, such as 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethyl-bicyclo[2.2.1]heptane, 2,2-diethyl-1,3-propanediol, 2,2-dipropyl-1,3-propanediol, 2-cyclohexyl-2-methyl-1,3-propanediol, et cetera.

Examples of diols ($u_2$) (formula (II')) that may be used include 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-bis(2'-hydroxypropyl)benzene, and 1,3-bis(2'-hydroxypropyl) benzene.

As diols ($u_1$) it is preferred to use 2-propyl-2-ethyl-1,3-propanediol, 2,2-diethyl-1,3-propanediol, 2-butyl-2-ethyl-1,3-propanediol, and 2-phenyl-2-ethyl-1,3-propanediol, and as component ($u_2$) it is preferred to use 2,3-dimethyl-2,3-butanediol and also 2,5-dimethyl-2,5-hexanediol. Particular preference is given to using 2-butyl-2-ethyl-1,3-propanediol and also 2-phenyl-2-ethyl-1,3-propanediol as component ($u_1$) and 2,5-dimethyl-2,5-hexanediol as component ($u_2$).

The diols ($u_1$) and/or ($u_2$) are commonly used in an amount of from 0.5 to 15% by weight, preferably from 1 to 7% by weight, based in each case on the overall weight of the synthesis components used to prepare the polyurethane resins (b13).

Typical multifunctional isocyanates used to prepare the polyurethane resins (b13) are aliphatic, cycloaliphatic and/or aromatic polyisocyanates containing at least two isocyanate groups per molecule. Preference is given to the isomers or isomer mixtures of organic diisocyanates. Owing to their good stability to ultraviolet light, (cyclo)aliphatic diisocyanates give rise to products having only a low tendency to yellow. The polyisocyanate component used to form the prepolymer may also contain a fraction of polyisocyanates of higher functionality, provided that no gelling is caused as a result. Products which have become established as triisocyanates are those formed by trimerization or oligomerization of diisocyanates or by reaction of diisocyanates with polyfunctional compounds containing OH or NH groups. The average functionality may be lowered if desired by adding monoisocyanates.

Examples of polyisocyanates that may be used include phenylene diisocyanate, tolylene diisocyanate, xylylene diisocyanate, bisphenylene diisocyanate, naphthylene diisocyanate, diphenylmethane diisocyanate, isophorone diisocyanate, cyclobutane diisocyanate cyclopentylene diisocyanate, cyclohexylene diisocyanate, methylcyclohexylene diisocyanate, dicyclohexylmethane diisocyanate, ethylene diisocyanate, trimethylene diisocyanate, tetramethylene diisocyanate, pentamethylene diisocyanate, hexamethylene diisocyanate, propylene diisocyanate, ethylethylene diisocyanate, and trimethylhexane diisocyanate.

To prepare high-solids polyurethane resin solutions (b13), use is made in particular of diisocyanates of the general formula (III')

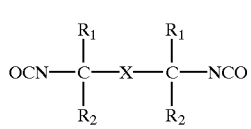

(III')

where X is a divalent aromatic hydrocarbon radical, preferably an unsubstituted or halogen-, methyl- or methoxy-substituted naphthylene, diphenylene or 1,2-, 1,3- or 1,4-phenylene radical, with particular preference a 1,3-phenylene radical, and $R_1$ and $R_2$ are an alkyl radical having 1–4 carbon atoms, preferably a methyl radical. Diisocyanates of the formula (III') are known (their preparation is described, for example, in EP-A-101 832, U.S. Pat. No. 3,290,350, U.S. Pat. No. 4,130,577, and U.S. Pat. No. 4,439,616) and some are available commercially (1,3-bis(2-isocyanatoprop-2-yl)benzene, for example, is sold by the American Cyanamid company under the tradename TMXDI (META)®).

Further preferred polyisocyanate components are diisocyanates of the formula (IV'):

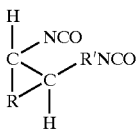

(IV')

where: R is a divalent alkyl or aralkyl radical having from 3 to 20 carbon atoms and R' is a divalent alkyl or aralkyl radical having from 1 to 20 carbon atoms;
especially 1-isocyanato-2-(3-isocyanatoprop-1-yl)cyclohexane.

Polyurethanes are generally incompatible with water unless specific constituents are incorporated and/or special preparation steps taken in the course of their synthesis. To prepare the polyurethane resins (b13) it is thus possible to use compounds which contain two H-active groups that are reactive with isocyanate groups, and at least one group which ensures dispersibility in water. Suitable groups of this kind are the above-described nonionic groups (iii) (e.g., polyethers), the above-described anionic groups (ii), mixtures of these two groups, or the above-described cationic groups (i).

Accordingly it is possible to build into the polyurethane resin (b13) an acid number which is sufficiently large that the neutralized product can be dispersed safely in water. For this purpose use is made of compounds containing at least one isocyanate-reactive group and at least one group (ii) capable of forming anions. Suitable isocyanate-reactive groups are, in particular, hydroxyl groups and also primary and/or secondary amino groups. Groups (ii) capable of forming anions are carboxyl, sulfonic acid and/or phosphonic acid groups. It is preferred to use alkanoic acids having two substituents on the alpha carbon atom. The substituent may be a hydroxyl group, an alkyl group or an alkylol group. These polyols have at least one, generally from 1 to 3, carboxyl groups in the molecule. They have from 2 to about 25, preferably from 3 to 10 carbon atoms. The polyol containing carboxyl groups (ii) may account for from 3 to 100% by weight, preferably from 5 to 50% by weight, of the overall polyol constituent in the NCO prepolymer.

The amount of ionizable carboxyl groups (ii) that is available by virtue of the carboxyl group neutralization in salt form is generally at least 0.4% by weight, preferably at least 0.7% by weight, based on the solids. The upper limit is approximately 12% by weight. The amount of dihydroxyalkanoic acids in the unneutralized prepolymer gives an acid number of at least 5 mg KOH/g, preferably at least 10 mg KOH/g. With very low acid numbers, it is generally necessary to take further measures to achieve dispersibility in water. The upper limit on the acid number is 150 mg KOH/g, preferably 40 mg KOH/g, based on the solids. The acid number is preferably situated within the range from 20 to 40 mg KOH/g.

The isocyanate groups of the isocyanato-containing prepolymer are reacted with a modifier or chain extender. The modifier is preferably added in an amount such that instances of chain extension and thus of molecular weight increase occur. Modifiers used are preferably organic compounds containing hydroxyl and/or secondary and/or primary amino groups, especially polyamines and/or polyols with a functionality of two, three and/or more. Examples of polyamines which can be used include ethylenediamine, trimethylediamine, tetramethylenediamine, pentamethylenediamine, hexamethylenediamine or diethylenetriamine. Examples of polyols which can be used include trimethylolpropane, 1,3,4-butanetriol, glycerol, erythritol, mesoerythritol, arabitol, adonitol, etc.

Trimethylolpropane is used with preference. To prepare the polyurethane resin (b13) it is preferred first to prepare an isocyanato-containing prepolymer from which the desired polyurethane resin (b13) is then prepared by further reaction, preferably chain extension. The reaction of the components takes place in accordance with the well-known processes of organic chemistry- (cf., e.g., Kunststoff-Handbuch [Plastics Handbook], Volume 7: Polyurethane [polyurethanes], edited by Dr. Y. Oertel, Carl Hanser Verlag, Munich, Vienna, 1983). Examples of the preparation of the prepolymers are described in DE-A 26 24 442 and DE-A 31 10 051. The polyurethane resins (b13) may be prepared by the known methods (e.g., acetone method).

The components are preferably reacted in ethoxyethyl propionate (EEP) as solvent. The amount of EEP in this case may be varied within wide limits and should be sufficient for the formation of a prepolymer solution of appropriate viscosity. In general up to 70% by weight, preferably from 5 to 50% by weight, and with particular preference less than 20% by weight of solvent is used, based on the solids. Accordingly, the reaction may be carried out with very particular preference for example, at a solvent content of 10–15% by weight EEP, based on the solids.

The reaction of the components may take place if desired in the presence of a catalyst, such as organotin compounds and/or tertiary amines.

To prepare the prepolymers, the amounts of the components are chosen such that the equivalents ratio of NCO groups to OH groups is situated between 2.0:1.0 and ≧1.0:1.0, preferably between 1.4:1 and 1.1:1.

The NCO prepolymer contains at least about 0.5% by weight of isocyanate groups, preferably at least 1% by weight of NCO, based on the solids. The upper limit is approximately 15% by weight, preferably 10% by weight, with particular preference 5% by weight of NCO.

The water-soluble or water-dispersible finely divided solid binders (b1) to be used in accordance with the invention may be present individually or as a mixture.

If they are to be used in a mixture, it should be ensured that finely divided solid binders (b1) containing functional groups (i) are not combined with finely divided solid binders (b1) containing functional groups (ii), since this may lead to the formation of insoluble polyelectrolyte complexes.

Furthermore, the finely divided solid binders (b1) may comprise the binders (a1) described below which per se are not soluble or dispersible in water but which can be dispersed in water in the presence of the water-soluble or dispersible binders (b1). Examples of suitable non-water-soluble or -dispersible binders (a1) come from the oligomer and/or polymer classes described above but contain no hydrophilic functional groups (i), (ii) or (iii), or contain such groups only in such small quantity that no water-solubility or water-dispersibility results.

Where the mixing of the constituents, especially of the modules (i), (ii) and (iii), in the preparation of the coating materials of the invention is to take place by means of manual stirring, it is of advantage for the coating material of the invention if the finely divided solid binders (b1) are selected such that their 50% strength solution in ethoxyethyl propionate at 23° C. has a viscosity of ≦10 dpas. Where mixing is to take place by mechanical means, it is possible to use binders (b1) of higher viscosity whose 50% strength solution in ethoxyethyl propionate at 23° C. has a viscosity of ≦100 dpas. The upper limits on viscosity is set merely by the performance capacity of the mixing equipment.

The particle size of the finely divided solid binders (b1) is not critical. It is important that the particle size is not set so small that the particles tend to agglomerate and/or become respirable, or so large as to prevent or hinder redissolution or redispersion. In accordance with the invention, particle sizes of from 5 to 500 μm are of advantage.

The preparation of the finely divided solid binders (b1) has no special features in terms of its method but instead takes place as described above in accordance with the customary and known methods of polymerization in bulk, solution or emulsion or by suspension or precipitation polymerization and drying of the resultant binders (b1) using customary and known techniques and apparatus and under conditions which ensure the formation of finely divided solid products. Examples of suitable drying methods are spray drying, freeze drying, and precipitation from solution, emulsion or suspension.

Alternatively, the finely divided solid binders (b1) may be present in the form of a powder slurry which is dried by means of the aforementioned drying methods. In this case the optional constituents described below may be present in the powder slurry particles. Powder slurries and their preparation are customary and known and are described for example, in the patents EP-A-0 652 264, U.S. Pat. No. 4,268,542, DE-A-196 13 547 or DE-A-195 18 392.

In many cases it is of advantage to add aqueous media (C) containing at least one of the above-described neutralizing agents to the binders (b1) following their preparation in order to convert them into a secondary dispersion which is then dried. It is, however, also possible to neutralize the binders (b1) with at least one of the above-described neutralizing agents before the addition of the aqueous media (C) and then to convert them into a secondary dispersion.

In the case of polymerization in solution, use is made of solvents which do not hinder the drying but which instead are easy to remove from the binders (b1). Solvents having a comparatively high vapor pressure are preferably used. The same applies to the cosolvents which may be used in emulsion, suspension, or precipitation polymerization, or for preparing secondary dispersions, or to the nonsolvents used for precipitation.

Besides the binders (b1), the mixing varnish (B) may include as constituent (b2) all customary coatings pigments and/or fillers. In this context it is possible to use not only the pigments and fillers that are common in aqueous coating compositions and which do not react with water and/or do not dissolve in water, but also the pigments and fillers commonly employed in conventional coating compositions. The pigments and fillers may comprise organic or inorganic compounds and may impart color and/or effect. The coating material of the invention therefore ensures, owing to this large number of appropriate pigments and fillers, a universal scope for use, and permits the realization of a large number of shades and optical effects.

As effect pigments (b2) it is possible to use metal flake pigments, such as commercially customary aluminum bronzes, aluminum bronzes chromated in accordance with DE-A-36 36 183, and commercially customary stainless steel bronzes, and also nonmetallic effect pigments, such as pearlescent pigments and interference pigments, for example. Examples of suitable inorganic color pigments are titanium dioxide, iron oxides, Sicotrans yellow, and carbon black. Examples of suitable organic color pigments are indanthrene blue, Cromophthal red, Irgazine orange and Heliogen green. Examples of suitable fillers are chalk, calcium sulfates, barium sulfate, silicates such as talc or kaolin, silicas, oxides such as aluminum hydroxide or magnesium hydroxide, nanoparticles or organic fillers such as textile fibers, cellulose fibers, polyethylene fibers or wood flour.

The coating composition of the invention may further comprise crosslinking agents (b3); it is important that the crosslinking agents (b3) do not adversely affect the storage stability of the mixing varnish (B), by premature crosslinking, for instance. The person skilled in the art is therefore able simply to select the appropriate combinations of crosslinking agents (b3) on the one hand and binders (b1) on the other.

Examples of suitable crosslinking agents (b3) are blocked diisocyanates and/or polyisocyanates.

Examples of suitable di- and/or polyisocyanates are organic polyisocyanates, especially what are known as paint polyisocyanates, having free isocyanate groups attached to aliphatic, cycloaliphatic, araliphatic and/or aromatic moieties. Preference is given to using polyisocyanates having from 2 to 5 isocyanate groups per molecule and viscosities of from 100 to 10,000, preferably from 100 to 5000, and—where manual mixing of components (I), (II) and (III) is intended—in particular from 1000 to 2000 mPas (at 23° C.). If desired, small amounts of organic solvent, preferably from 1 to 25% by weight based on straight polyisocyanate, may be added to the polyisocyanates in order to make it easier to incorporate the isocyanate and, if appropriate, to reduce the viscosity of the polyisocyanate to a level within the abovementioned ranges. Examples of suitable solvent additives to the polyisocyanates are ethoxyethyl propionate, amyl methyl ketone, and butyl acetate. Furthermore, the polyisocyanates (C) may have been hydrophilically or hydrophobically modified in a customary and known manner.

Examples of suitable polyisocyanates are described, for example, in "Methoden der organischen Chemie" [Methods of organic Chemistry], Houben-Weyl, Volume 14/2, 4th Edition, Georg Thieme Verlag, Stuttgart, 1963, pages 61 to 70, and by W. Siefken, Liebigs Annalen der Chemie, Volume 562, pages 75 to 136. Suitable examples include the isocyanates specified in connection with the description of the polyurethane resins (b13), and/or isocyanato-containing polyurethane prepolymers, which may be prepared by reacting polyols with an excess of polyisocyanates and which are preferably of low viscosity.

Further examples of suitable polyisocyanates are polyisocyanates containing isocyanurate, biuret, allophanate, iminooxadiazinedione, urethane, urea and/or uretdione groups. Polyisocyanates containing urethane groups, for example, are prepared by reacting some of the isocyanate groups with polyols, such as trimethylolpropane and glycerol, for example. Preference is given to the use of aliphatic or cycloaliphatic polyisocyanates, especially hexamethylene diisocyanate, dimerized and trimerized hexamethylene diisocyanate, isophorone diisocyanate, 2-isocyanatopropylcyclohexyl isocyanate, dicyclohexylmethane 2,4'-diisocyanate, dicyclohexylmethane 4,4'-diisocyanate, or 1,3-bis(isocyanatomethyl)cyclohexane, diisocyanates derived from dimeric fatty acids, as marketed under the commercial designation DDI 1410 by Henkel, 1,8-diisocyanato-4-isocyanatomethyloctane, 1,7-diisocyanato-4-isocyanatomethylheptane or 1-iso-cyanato-2-(3-isocyanatopropyl)cyclohexane, or mixtures of these polyisocyanates.

Very particular preference is given to using mixtures of polyisocyanates containing uretdione and/or isocyanurate and/or allophanate groups and based on hexamethylene diisocyanate, as are formed by catalytic oligomerization of hexamethylene diisocyanate using appropriate catalysts. The polyisocyanate constituent may further consist of any desired mixtures of the free polyisocyanates exemplified.

Examples of suitable blocking agents are aliphatic, cycloaliphatic or araliphatic monoalcohols such as methyl, butyl, octyl or lauryl alcohol, cyclohexanol or phenylcarbinol; hydroxylamines such as ethanolamine; oximes such as methyl ethyl ketone oxime, acetone oxime or cyclohexanone oxime; amines such as dibutylamine or diisopropylamine; CH-acidic compounds such as malonic diesters or ethyl acetoacetate; heterocycles such as dimethylpyrazole; and/or lactams such as epsiloncaprolactam.

Further examples of suitable crosslinking agents (b3) are polyepoxides (b3), particularly all known aliphatic and/or cycloaliphatic and/or aromatic polyepoxides, examples being those based on bisphenol A or bisphenol F. Other suitable examples of polyepoxides (b3) are the polyepoxides available commercially under the designations Epikote® from Shell, Denacol® from Nagase Chemicals Ltd., Japan, such as Denacol EX-411 (pentaerythritol polyglycidyl ether), Denacol EX-321 (trimethylolpropane polyglycidyl ether), Denacol EX-512 (polyglycerol polyglycidyl ether), and Denacol EX-521 (polyglycerol polyglycidyl ether).

As crosslinking agents (b3) it is also possible to use tris(alkoxycarbonylamino)triazines of the formula

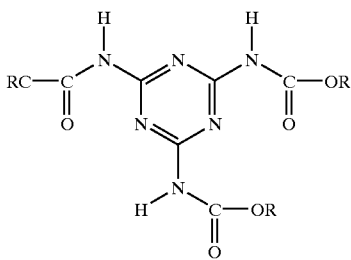

Examples of suitable tris(alkoxycarbonylamino)triazines (b3) are described in the patents U.S. Pat. No. 4,939,213, U.S. Pat. No. 5,084,541, or EP-A-0 624 577. Use is made in particular of the tris(methoxy-, tris(butoxy- and/or tris(2-ethylhexoxycarbonylamino)triazines.

The methyl butyl mixed esters, the butyl 2-ethylhexyl mixed esters, and the butyl esters are of advantage. They have the advantage over the straight methyl ester of better solubility in polymer melts, and also have less of a tendency to crystallize out.

Further examples of suitable crosslinking agents (b3) are amino resins, examples being melamine resins. In this instance, use can be made of any amino resin suitable for transparent topcoats or clearcoats, or of a mixture of such amino resins. Particularly suitable are the customary and known amino resins some of whose methylol and/or methoxymethyl groups have been defunctionalized by means of carbamate or allophanate groups. Crosslinking agents of this kind are described in the patents U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, Volume 13, pages 193 to 207. The amino resins may also be used as binders (a1) in the base paint (A).

Further examples of suitable crosslinking agents (b3) are beta-hydroxyalkylamides such as N,N,N',N'-tetrakis(2-hydroxyethyl)adipamide or N,N,N',N'-tetrakis(2-hydroxypropyl)adipamide.

Further examples of suitable crosslinking agents (b3) are siloxanes, especially siloxanes containing at least one trialkoxy- or dialkoxysilane group.

The mixing varnish (B) may further comprise auxiliaries and/or additives (b4) such as UV absorbers; free-radical scavengers; crosslinking catalysts, especially organometallic compounds, preferably organotin and/or organobismuth compounds or tertiary amines; slip additives; polymerization inhibitors; defoamers; adhesion promoters; leveling agents or film formation auxiliaries, e.g. cellulose derivatives; or other additives commonly employed in coating materials.

As auxiliary and additive (b4) use may be made in particular of at least one rheology control additive. Examples of suitable rheology control additives (b4) are those known from the patents WO 94/22968, EP-A-0 276 501, EP-A-0 249 201 or WO 97/12945; crosslinked polymeric microparticles, as disclosed for example in EP-A-0 008 127; inorganic phyllosilicates such as aluminum magnesium silicates, sodium magnesium phyllosilicates, and sodium magnesium fluorine lithium phyllosilicates of the montmorillonite type; silicas such as Aerosils; or synthetic polymers containing ionic and/or associative groups, such as polyvinyl alcohol, poly(meth)acrylamide, poly(meth)acrylic acid, polyvinylpyrrolidone, styrene-maleic anhydride or ethylene maleic anhydride copolymers and their derivatives, or hydrophobically modified ethoxylated urethanes or polyacrylates. Preferred rheology control additives (b4) used are polyurethanes and/or phyllosilicates.

The mixing varnish (B) may further comprise constituents (b5) which are curable with actinic radiation, especially UV radiation and/or electron beams. This offers the advantage that the coating materials of the invention are both thermally curable and radiation curable.

Suitable constituents (b5) include in principle all low molecular mass, oligomeric and polymeric compounds which are curable with actinic radiation, especially UV radiation and/or electron beams, such compounds being those as commonly used in the field of UV-curable or electron beam-curable coating compositions. These radiation-curable coating compositions normally include at least one, preferably two or more, radiation-curable binders, based in particular on ethylenically unsaturated prepolymers and/or ethylenically unsaturated oligomers, one or more reactive diluents if desired, and one or more photoinitiators if desired.

It is advantageous to use the radiation-curable binders as constituents (b5). Examples of suitable radiation-curable binders (b5) are (meth)acryloyl-functional (meth)acrylic copolymers, polyether acrylates, poly-ester acrylates, unsaturated polyesters, epoxy acrylates, urethane acrylates, amino acrylates, melamine acrylates, silicone acrylates, and the corresponding methacrylates. It is preferred to use binders (b5) which are free from aromatic structural units. Preference is therefore given to using urethane(meth)acrylates and/or polyester(meth)acrylates, with particular preference aliphatic urethane acrylates.

The further key constituent of the coating material of the invention is at least one base paint (A).

The base paint (A) for use in accordance with the invention is in turn the key constituent of the color and/or effect module for use in accordance with the invention.

The base paint (A) for use in accordance with the invention comprises at least one optionally water-soluble or -dispersible binder (a1). Where a binder (a1) is used which per se is not soluble or dispersible in water, it must be at least dispersible in the presence of the above-described water-soluble or -dispersible binders (b1). Examples of suitable binders (a1) not soluble or dispersible in water come from the oligomer and/or polymer classes described above in connection with the binders (b1) except that they contain no hydrophilic functional groups (i), (ii) or (iii) or contain such groups only in so small a quantity that it does not result in solubility or dispersibility in water.

In accordance with the invention, however, water-soluble or -dispersible binders (a1) are of advantage and therefore used with particular preference. Examples of suitable water-soluble or -dispersible binders (a1) are the above-described binders (b1). The base paint (A) may include binders (a1) which are different from the binders (b1). In this case it is important to select the binders (b1) and (a1) so as not to result in any separation in the coating material of the invention in question, owing to polymer incompatibility. However, they may also comprise the same binders (a1=b1). Which variant is preferred in any one specific case depends on the desired profile of properties of the coating material of the invention.

In accordance with the invention, advantageous binders (a1) are those which have been prepared in the reactive diluents described below.

The base paint (A) used in accordance with the invention further comprises at least one color and/or effect pigment (a2).

Examples of suitable pigments (a2) are the above-described pigments (b2). The base paint (A) in this case may comprise pigments (a2) which are different from the pigments (b2). For example, the color pigments (b2) may be present in the mixing varnish (B) and the effect pigments (a2) may be present in the base paint (A). However, the pigments involved may also be the same (a2=b2).

The base paint (A) for use in accordance with the invention further comprises at least one water-miscible organic solvent (a3).

Examples of suitable water-miscible organic solvents (a3) are esters, ketones, such as acetone or methyl isobutyl ketone, keto esters, glycol ethers such as ethylene, propylene or butylene glycol ethers, glycol esters such as ethylene, propylene or butylene glycol esters or glycol ether esters such as ethoxy ethylpropionate, or amides such as N-methylpyrrolidone or N,N-dimethylacetamide.

Further examples of suitable water-miscible organic solvents (a3) are what are known as reactive diluents, which are able to participate in the reaction with the crosslinking agents (a5) and/or (b2).

Examples of suitable thermally crosslinkable reactive diluents (a3) are branched, cyclic and/or acyclic $C_9$–$C_{16}$ alkanes functionalized with at least two hydroxyl groups, preferably dialkyloctanediols, especially the positionally isomeric diethyloctanediols.

Further examples of suitable thermally crosslinkable reactive diluents (a3) are oligomeric polyols obtainable by hydroformylation and subsequent hydrogenation of oligomeric intermediates themselves obtained by metathesis reactions of acyclic monoolefins and cyclic monoolefins; examples of suitable cyclic monoolefins are cyclobutene, cyclopentene, cyclohexene, cyclooctene, cycloheptene, norbornene or 7-oxanorbornene; examples of suitable acyclic monoolefins are contained in hydrocarbon mixtures obtained in petroleum processing by cracking ($C_5$ cut); examples of suitable oligomeric polyols for use in accordance with the invention have a hydroxyl number (OHN) of from 200 to 450, a number average molecular weight Mn of 400 to 1000, and a mass average molecular weight Mw of from 600 to 1100;

Further examples of suitable thermally crosslinkable reactive diluents (a3) are hyperbranched compounds having a tetrafunctional central group, derived from ditrimethylolpropane, diglycerol, ditrimethylolethane, pentaerythritol, tetrakis(2-hydroxyethyl)methane, tetrakis(3-hydroxypropyl)methane or 2,2-bishydroxymethyl-1,4-butanediol(homopentaerythritol). These reactive diluents may be prepared by the customary and known methods of preparing hyperbranched and dendrimeric compounds. Suitable synthesis methods are described, for example, in the patents WO 93/17060 or WPO 96/12754 or in the book by G. R. Newkome, C. N. Moorefield and F. Vögtle, "Dendritic Molecules, Concepts, Syntheses, Perspectives", VCH, Weinheim, N.Y., 1996.

Further examples of suitable reactive diluents (a3) are polycarbonatediols, polyesterpolyols, poly(meth)acrylatediols or hydroxyl-containing polyadducts.

Examples of suitable reactive solvents (a3) are butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, trimethylolpropane, ethyl 2-hydroxypropionate or 3-methyl-3-methoxybutanol and also derivatives based on propylene glycol, e.g., ethoxyethyl propionate, isopropoxypropanol or methoxypropyl acetate.

The base paint (A) for use in accordance with the invention may further comprise at least one crosslinking agent (a5). Examples of suitable crosslinking agents (a5) are above-described crosslinking agents (b2). The base paint (A) may contain crosslinking agents (a5) differing from those present in the mixing varnish (B). Alternatively, the same crosslinking agents may be present (a5=b2).

Not least, the base paint (A) may comprise at least one auxiliary and/or additive (a6). Examples of suitable auxiliaries and additives are the above-described auxiliaries and additives (b4). Here again, the base paint (A) may contain the same auxiliaries and/or additives as are present in the mixing varnish (B) (a6=b4). Owing to the different functions of the base paints (A) and of the mixing varnish (B), however, different auxiliaries and additives (a6) and (b4) are generally used.

The base paint (A) may further include constituents (a7) which are curable with actinic radiation, especially UV radiation and/or electron beams. This offers the advantage that the coating materials of the invention are curable both thermally and by means of radiation. Examples of suitable such constituents (a7) are the above-described constituents (b5). The base paint (A) may comprise the same constituents as may be present in the mixing varnish (B) (a7=b5). It is, however, also possible to use different constituents (a7) and (b5).

The further key constituent of the coating material of the invention is the aqueous medium (C) or the dispersing module (III), whose key constituent is in turn the aqueous medium (C).

The aqueous medium (C) essentially comprises water. The aqueous medium (C) may contain minor amounts of the above-detailed binders (a1) or (b1), organic solvents (a3) and neutralizing agents, crosslinking agents (a5) or (b3) and/or auxiliaries and/or additives (a6) or (b3) and/or other dissolved solid, liquid or gaseous, organic and/or inorganic substances of high and/or low molecular weight. In the context of the present invention, the term "minor amount" means an amount which does not take away the aqueous character of the aqueous medium (C).

The aqueous medium (C) may also, however, comprise simply water.

The composition of the coating materials of the invention may vary extremely widely and is guided by the intended use for which they are envisaged in each case. In this context it is possible to use the proportions stated in the prior art, especially in the patents EP-A-0 578 645 or EP-A-0 608 773, as a guideline. The skilled worker will therefore easily be able to determine the composition best suited for each intended use on the basis of the prior art or on the basis of his or her general knowledge in the art, possibly with the assistance of preliminary range finding tests.

The coating material of the invention may be prepared in any desired way by mixing of its above-described constituents in arbitrary sequence. In accordance with the invention, however, it is of advantage to employ the process of the invention.

The process of the invention starts from the preparation of at least one base paint (A) or of at least one color and/or effect module (I) by mixing of the above-detailed constituents (a1) to (a3) and also, where appropriate (a4) to (a7).

Furthermore, at least one finely divided solid mixing varnish (B) or at least one solids module (II) is prepared by mixing and drying of the constituents (b1) and also, where appropriate, (b2) to (b4). Not least, at least one aqueous medium (C) or at least one dispersing module (III) is prepared.

The key constituents (A), (B) and (C) or the modules (I), (II) and (III) are mixed with one another in a further process step to give the coating material of the invention. The sequence in which the key constituents of the modules are mixed with one another may vary from one coating material to another and is something which the skilled worker can easily determine on the basis of the prior art and his or her general knowledge in the art, with the assistance where appropriate of preliminary range finding tests.

For example, the base paint (A) of the module (I) may be dispersed in the aqueous medium (C) or in the module (III), and the addition may take place all at once or in portions. Subsequently, the mixing varnish (B) or the module (II) may be added, all at once or in portions, to the mixture (A/C).

Alternatively, the mixing varnish (B) or the module (II) may be metered all at once or in portions into the aqueous medium (C) or the module (III) and dissolved or dispersed therein. Thereafter the base paint (A) or the module (I) may be added, all at once or in portions, to the mixture (B/C).

Furthermore, the base paint (A) or the module (I) and the mixing varnish (B) or the module (II) may be metered simultaneously, all at once or in portions, into the aqueous medium (C) or the module (III) and dissolved or dispersed therein.

It is possible not least for the aqueous medium (C) or the module (III) to be metered all at once or in portions into the base paint (A) or the module (I), after which the mixing varnish (B) or the module (II) is added. However, the mixing varnish (B) or the module (II) may already be present in the base paint (A) or the module (I) when the aqueous medium (C) or the module (III) is added.

Critical to the selection of one variant of the process of the invention is the consideration that there should be not phase separation and/or no precipitation of constituents during the mixing operation.

Following its preparation, the coating material of the invention may be adjusted to the viscosity needed for its application by addition of further aqueous medium (C).

The coating materials of the invention may be applied to any desired substrates, such as metal, wood, plastic, glass or paper, for example, by means of customary application methods, such as spraying, knife coating, brushing, flow coating, dipping or rolling, for example.

When used in automotive refinish, the coating materials of the invention are normally cured at temperatures of below 120° C., preferably at temperatures not more than 80° C. When used in automotive OEM finishing, higher curing temperatures are employed as well.

The coating materials of the invention are used preferably to produce top coats. The coating materials of the invention may be used both in the OEM finishing and in the refinishing of automobile bodies. They are preferably used in the field of refinish and in the coating of plastic parts.

The aqueous coating materials of the invention may be used as primer-surfacers and also for producing single-coat top coats and also as pigmented base coat materials in a process for producing a multicoat paint system (base coat/clearcoat process).

EXAMPLES

Preparation Example 1

Preparation of an Aluminum-containing Base Paint (A)

27 parts by weight of an aluminum bronze chromated in accordance with the patent DE-A-36 36 183 (Al content: 65% by weight, average particle diameter: 15 micrometers) are distributed homogeneously in 27 parts by weight of butyl glycol by stirring for 15 minutes. Subsequently, a mixture of 10 parts by weight of butyl glycol and 36 parts by weight of a commercially customary, methyl-etherified melamine resin (75% strength by weight in isobutanol) is run in with stirring. This mixture is stirred using a high speed stirrer at 1000 rpm for a further 30 minutes.

Preparation Example 2

The preparation of a Polyurethane Dispersion for the Mixing Varnish (B)

2.1 Preparation of the Polyester Resin Solution

In a steel reactor suitable for polycondensation reactions, 4634 kg of Pripol® 1013 (dimer fatty acid from Unichema), 1522 kg of 1,6-hexanediol, 1874 kg of isophthalic acid and 331 kg of xylene as entrainer were weighed in and heated to 150° C. The temperature of the mixture was raised to a maximum of 220° C. in such a way that the column overhead temperature did not exceed 125° C. From an acid number of 5 the volatile constituents were distilled off and the reaction was continued until an acid number of 3.5 had been reached.

2.2 Preparation of the Polyurethane Resin Dispersion 143.4 kg of the polyester resin solution from section 2.1 of this preparation example were heated together with 9.4 kg of dimethylolpropionic acid, 1.9 kg of neopentyl glycol, 50.5 kg of Desmodur® W (commercial polyisocyanate from Bayer) and 44 kg of methyl ethyl ketone until the isocyanate content was constant. Subsequently, based on an amount of 1.1% by weight of isocyanate groups, 4.9 kg of trimethylolpropane were added. When the viscosity entered a range from 12 to 14 dPas (measured 50% strength by weight in N-methylpyrrolidone), further reaction was prevented by the addition of 2.7 kg of n-butanol. After stirring at 82° C. for 60 minutes, 5.0 kg of dimethylethanolamine were added. After stirring at 82° C. for 30 minutes, 34.2 kg of Pluriol P900 (commercial wetting agent from BASF AG) were added, after which the resulting mixture was stirred at 82° C. for 30 minutes more.

Subsequently, the solids content was adjusted to 70% by weight (one hour at 130° C.) using methyl ethyl ketone, and 434.9 kg of deionized water were added. The solids content was 27.8% by weight, the pH 7.82. The reaction mixture was homogeneous and free from specks and threads.

At a product temperature of from 50 to 82° C., the methyl ethyl ketone was removed by vacuum distillation down to a residual content of <0.5% by weight. Thereafter the solids content was adjusted to 30.3% by weight using deionized water. The pH of the resulting dispersion was 7.73.

Although the dispersion, when handled properly and carefully or under test conditions, was stable on storage at 40° C. for more than four weeks, under operating conditions and/or during transit there were frequent instances of infestation by microorganisms, as a result of which the dispersion became unusable.

Preparation Example 3

Preparation of a Mixing Varnish (B)

33.2 parts by weight of the polyurethane dispersion from preparation example 2 were admixed with stirring with 43 parts by weight of a preswollen aqueous paste containing 3% by weight of an inorganic sodium magnesium phyllosilicate thickener and 3% by weight of propylene glycol having a number average molecular weight of 900, the percentages being based on the total weight of the paste, 19.8 parts by weight of deionized water, 0.5 part by weight of a commercial defoamer and 3.5 parts by weight of a 3.5% strength by weight solution of a commercial polyurethane thickener in water.

The resulting mixture was converted into the finely divided pulverulent mixing varnish (B) using a disk atomizing drier. The glass transition temperature of the mixing varnish (B) was −38° C.

The mixing varnish (B) possessed virtually unlimited storability with no evidence of infestation by microorganisms. Even after storage for months, it could be used without restriction to prepare coating materials of the invention.

Example

The Preparation of the Coating Material of the Invention

. . . parts by weight of the mixing varnish (B) from preparation example 3 were dispersed or dissolved with stirring, in portions, in . . . parts by weight of deionized water . . . parts by weight of the base paint (A) from preparation example 1 were added with stirring to the resulting mixing varnish solution (B/C). Homogenization gave a coating material of the invention which was stable on storage. In terms of its performance properties it was fully equal to the coating materials prepared conventionally using the dispersion from preparation example 2 on its own. For application, the coating material of the invention was adjusted to the spray viscosity using water, without problems—i.e., with no phase separation or precipitation of the constituents. Multicoat coatings of outstanding optical quality were obtained using the base coat/clearcoat process. This remained the case even when the mixing varnish (B) had been stored at from 30 to 40° C. for several months during the summer.

What is claimed is:

1. A modular system for preparing aqueous coating materials comprising:

(I) at least one of a color module and an effect module comprising:
(A) at least one base paint comprising:
(a1) at least one binder;
(a2) at least one of a color pigment and an effect pigment;
(a3) at least one water-miscible organic solvent; and optionally comprising at least one of,
(a4) water,
(a5) at least one crosslinking agent;
(a6) at least one auxiliary; and
(a7) at least one additive;
(II) at least one solids module comprising at least one solid, finely divided mixing varnish comprising at least one water-soluble or -dispersible, finely divided, solid binder, wherein the solids module is a solid; and
(III) at least one dispersing module comprising an aqueous medium.

2. The modular system of claim 1, wherein the binder is one of water-soluble and water-dispersible.

3. The modular system of claim 1, wherein the mixing varnish further comprises at least one of i) at least one of a color pigment and an effect pigment; ii) at least one crosslinking agent; iii) at least one auxiliary; and iv) at least one additive.

4. The modular system of claim 1, wherein the binder of the base paint and the binder of the varnish are one of identical to each other and different from each other.

5. The modular system of claim 3, wherein the aqueous coating material is further characterized by at least one of:
i) the color pigments of the base paint and the color pigments of the varnish are one of identical to each other and different from each other;
ii) the effect pigments of the base paint and the effect pigments of the varnish are one of identical to each other and different from each other;
iii) the crosslinking agents of the base paint and the crosslinking agents of the varnish are one of identical to each other and different from each other;
iv) the auxiliary of the base paint and the auxiliary of the varnish are one of identical to each other and different from each other; and
v) the additive of the base paint and the additive of the varnish are one of identical to each other and different from each other.

6. The modular system of claim 1, wherein at least one of the binder of the varnish and the binder of the base paint each comprise at least one of:
i) functional groups that can be converted into cations by at least one of neutralizing agents and quaternizing agents;
ii) cationic groups;
iii) functional groups that can be converted into anions by neutralizing agents;
iv) anionic groups; and
v) nonionic hydrophilic groups.

7. The modular system of claim 1, wherein at least one of the binder of the varnish and the binder of the base paint each comprise at least one of carboxylic acid groups and carboxylate groups.

8. A process comprising applying the modular system of claim 1 to an article.

9. The process of claim 8, wherein the modular system on the article is at least one of an automotive OEM finish, an automotive refinish, a plastic coating, a topcoat, and a primer-surfacer coating.

10. A process for preparing an aqueous coating material comprising dispersing:

(A) at least one base paint comprising:
  (a1) at least one binder;
  (a2) at least one of a color pigment and an effect pigment;
  (a3) at least one water-miscible organic solvent; and and optionally comprising at least one of:
  (a4) water,
  (a5) at least one crosslinking agent;
  (a6) at least one auxiliary; and
  (a7) at least one additive;
(B) a Component B comprising at least one solid, finely divided mixing varnish comprising at least one finely divided solid binder, wherein Component B is a solid; in
(C) an aqueous medium.

11. The process of claim 10, wherein the binder is one of water-soluble and water-dispersible.

12. The process of claim 10, wherein the mixing varnish further comprises at least one of i) at least one of a color pigment and an effect pigment; ii) at least one crosslinking agent; iii) at least one auxiliary; and iv) at least one additive.

13. The process of claim 10, wherein the binder of the base paint and the binder of the varnish are one of identical to each other and different from each other.

14. The process of claim 12, wherein the aqueous coating material is further characterized by at least one of:
  i) the color pigments of the base paint and the color pigments of the varnish are one of identical to each other and different from each other;
  ii) the effect pigments of the base paint and the effect pigments of the varnish are one of identical to each other and different from each other;
  iii) the crosslinking agents of the base paint and the crosslinking agents of the varnish are one of identical to each other and different from each other;
  iv) the auxiliary of the base paint and the auxiliary of the varnish are one of identical to each other and different from each other; and
  v) the additive of the base paint and the additive of the varnish are one of identical to each other and different from each other.

15. The process of claim 10, wherein at least one of the binder of the varnish and the binder of the base paint each comprise at least one of:
  i) functional groups that can be converted into cations by at least one of neutralizing agents and quaternizing agents;
  ii) cationic groups;
  iii) functional groups that can be converted into anions by neutralizing agents;
  iv) anionic groups; and
  v) nonionic hydrophilic groups.

16. The process of claim 10, wherein at least one of the binder of the varnish and the binder of the base paint each comprise at least one of carboxylic acid groups and carboxylate groups.

17. The process of claim 10, further comprising applying the aqueous coating material to an article.

18. The process of claim 17, wherein the aqueous coating material on the article is at least one of an automotive OEM finish, an automotive refinish, a plastic coating, a topcoat, and a primer-surfacer coating.

* * * * *